US005087385A

United States Patent [19]

Zielske

[11] Patent Number: 5,087,385

[45] Date of Patent: Feb. 11, 1992

[54] ACYLOXYNITROGEN PERACID PRECURSORS

[75] Inventor: Alfred G. Zielske, Pleasanton, Calif.

[73] Assignee: The Clorox Company, Oakland, Calif.

[21] Appl. No.: 542,233

[22] Filed: Jun. 21, 1990

Related U.S. Application Data

[60] Division of Ser. No. 338,475, Apr. 14, 1989, Pat. No. 4,957,647, which is a continuation of Ser. No. 928,065, Nov. 7, 1986, abandoned.

[51] Int. Cl.⁵ .................................... C09K 3/00

[52] U.S. Cl. .................... 252/186.39; 252/186.38

[58] Field of Search .................. 252/186.38, 186.39, 252/186.43, 186.31

[56] References Cited

U.S. PATENT DOCUMENTS

| | | | |
|---|---|---|---|
| 3,789,002 | 1/1974 | Weber et al. | 252/186.39 |
| 3,907,698 | 9/1975 | Loffelman et al. | 252/186.39 |
| 3,928,223 | 12/1975 | Murray | 252/186.39 |
| 4,167,487 | 9/1979 | Gray | 252/186.39 |
| 4,194,987 | 3/1980 | Brubaker | 252/186.39 |
| 4,367,156 | 1/1983 | Diehl | 252/186.38 |
| 4,486,327 | 12/1984 | Murphy et al. | 252/186.38 |
| 4,681,592 | 7/1987 | Hardy et al. | 252/186.38 |
| 4,778,618 | 10/1988 | Fong et al. | 252/186.39 |

*Primary Examiner*—Robert L. Stoll

*Assistant Examiner*—Joseph D. Anthony

*Attorney, Agent, or Firm*—Joel J. Hayashida; Michael J. Mazza; Harry A. Pacini

[57] ABSTRACT

The invention provides novel bleaching compositions comprising peracid precursors having oxynitrogen leaving groups. Peracid precursors containing these leaving groups provide new, proficient and cost-effective compounds for fabric bleaching.

These compounds have the general structures:

$$R-X-(CH_2)_n\overset{\overset{O}{\|}}{C}-O-N-R^1, \qquad (I)$$

wherein R is a straight or branched chain $C_{1-20}$ alkyl, alkoxyl, cycloalkyl and mixtures thereof; $R^1$ contains at least one carbon atom which is singly bonded directly to N; n is an integer from 1 to 6 and X is methylene or a heteroatom; or $$R-X-(CH_2)_n\overset{\overset{O}{\|}}{C}-O-N=R^2, \qquad (II)$$

wherein n is the same as in (I); but $R^2$ contains a carbon atom doubly bonded directly to N, and, either X is a heteroatom or nothing, R is $C_{4-17}$ alkyl or both.

10 Claims, No Drawings

ACYLOXYNITROGEN PERACID PRECURSORS

This is a division of application Ser. No. 07/338,475, filed Apr. 14, 1989, now U.S. Pat. No. 4,957,647, itself a continuation of Ser. No. 07/928,065, filed Nov. 7, 1986, and now abandoned.

BACKGROUND OF THE INVENTION

1. Field of the Invention

This invention relates to novel peroxygen bleach activator compounds that aid in providing efficient peroxygen bleaching of fabrics over a wide temperature range when combined with a source of hydrogen peroxide in aqueous media. These compounds have the general structures:

$$R-X-(CH_2)_n\overset{O}{\overset{\|}{C}}-O-N-R^1, \qquad (I)$$

wherein R is a straight or branched chain $C_{1-20}$ alkyl, alkoxyl, cycloalkyl and mixtures thereof; $R^1$ contains at least one carbon atom which is singly bonded directly to N; n is an integer from 1 to 6 and X is methylene or a heteroatom; or $$R-X-(CH_2)_n\overset{O}{\overset{\|}{C}}-O-N=R^2, \qquad (II)$$

wherein n is the same as in (I); but $R^2$ contains a carbon atom doubly bonded directly to N, and, either X is a heteroatom or nothing, R is $C_{4-17}$ alkyl or both.

2. Brief Statement on the Prior Art

It is well known that peroxygen bleaches are effective in removing stains and/or soils from textiles. They can be used on a wide variety of fabrics and colored garments. However the efficacy of peroxygen bleaches can vary greatly with temperature of the wash water in which they are used and they are usually most effective when the beaching solution is above 130° F. Below this temperature, it has been found that peroxide bleaching efficacy can be greatly increased by the simultaneous use of activators, otherwise known as peracid precursors. It has widely been accepted that in aqueous media, precursors and peroxygen combine to form peracid species. However, efficacy of most precursors, such as tetracetylethylene diamine (TAED), is also dependent on high wash water temperature. However, there is a need for bleach activator or peracid precursor compounds which are able to react with peroxide efficiently at low temperatures (70°-100° F.) to form peracids in good yields for proper cleaning performance.

Peracids themselves can be hazardous to make and are particularly prone to decomposition upon long-term storage. Thus it is advantageous to prepare the more stable peracid precursor compounds, which in alkaline water solution will react with peroxide anion to form the desired peracid in situ. As can be seen from the extensive literature in this area, many such peroxygen activators (peracid precursors) have been proposed. However, no reference appears to have taught, disclosed or suggested the advantages of leaving groups containing nitrogen in perhydrolysis.

Various compounds have been disclosed in the prior art that contain nitrogen as part of the leaving group of the peroxygen precursors. Murray, U.S. Pat. No. 3,969,257, Gray, U.S. Pat. No. 3,655,567, Baevsky, U.S. Pat. No. 3,061,550, and Murray, U.S. Pat. No. 3,928,223 appear to disclose the use of acyl groups attached to nitrogen atoms as leaving groups for activators. In all these examples, the acyl carbon atom is directly attached to the nitrogen atom. The nitrogen can in turn be attached to other carbonyl carbon groups.

In Finley et al, U.S. Pat. No. 4,164,395, a sulfonyl group is attached to the nitrogen atom of the leaving group. The activator structure is thus a sulfonyl oxime.

Dounchis et al, U.S. Pat. No. 3,975,153 teaches the use of only isophorone oxime acetate as a bleach activator. It is claimed that this isophorone derivative results in an activator of low odor and low toxicity. In Sarot et al, U.S. Pat. No. 3,816,319, the use of diacylated glyoximes are taught. The use is restricted to diacylated dialkylglyoximes wherein the alkyl group contains one to four carbon atoms and the acyl group contains two to four atoms. In neither reference is it disclosed, taught or suggested that it is surprisingly necessary to provide a heteroatom alpha to the carbonyl of the acyl group if a peracid precursor contains oxime as a leaving group. Additionally, neither reference discloses the unique advantages conferred by surface active peracid precursors which contain about 4-14 carbons in the acyl group.

SUMMARY OF THE INVENTION

The present invention comprises, in one embodiment, a bleaching composition comprising:

a bleaching composition comprising:

(a) a peracid precursor having the general structure:

$$R-X-(CH_2)_n\overset{O}{\overset{\|}{C}}-O-N-R^1, \qquad (I)$$

wherein R is a straight or branched chain $C_{1-20}$ alkyl, alkoxyl, cycloalkyl and mixtures thereof; $R^1$ contains at least one carbon atom which is singly bonded directly to N; n is an integer from 1 to 6 and X is methylene or a heteroatom; or $$R-X-(CH_2)_n\overset{O}{\overset{\|}{C}}-O-N=R^2, \qquad (II)$$

wherein n is the same as in (I); but $R^2$ contains a carbon atom doubly bonded directly to N, and either X is a heteroatom or nothing, R is $C_{4-17}$ alkyl or both; and (b) a bleach-effective amount of a source of hydrogen peroxide.

DETAILED DESCRIPTION OF THE INVENTION

The complete precursor (an ester) is $$R-X-(CH_2)_n\overset{O}{\overset{\|}{C}}-O-N-R^1, \qquad (I)$$

wherein R is a straight or branched chain $C_{1-20}$ alkyl, alkoxyl, cycloalkyl and mixtures thereof; $R^1$ contains at least one carbon atom which is singly bonded directly to N; n is an integer from 1 to 6 and X is methylene or a heteroatom; or

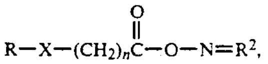 (II)

wherein n is the same as in (I); but $R^2$ contains a carbon atom doubly bonded directly to N, and, either X is a heteroatom or nothing, R is $C_{4-17}$ alkyl or both.

It is preferred that R is $C_{1-20}$ alkyl or alkoxylated alkyl. More preferably, R is $C_{4-17}$, and mixtures thereof. R can also be mono-unsaturated or polyunsaturated. If alkoxylated, ethoxy (EO) $-(-OCH_2CH_2)$ and propoxy (PO) $-(-OCH_2CH_2CH_2)$ groups are preferred, and can be present, per mole of ester, from 1–30 EO or PO groups, and mixtures thereof.

It is preferred for R to be from 4 to 17, and especially 6 to 12, carbons in the alkyl chain. Such alkyl groups would be surface active and would be desirable when the precursor is used to form surface active peracids for oxidizing fat or oil based soils from substrates at relatively low temperatures.

These alkyl groups are generally introduced onto the ester via an acid chloride synthesis discussed further below. Fatty acid chlorides such as hexanoyl chloride, heptanoyl chloride, octanoyl chloride, nonanoyl chloride, decanoyl chloride and the like provide this alkyl moiety. When it is desired to introduce an aryl group, an aromatic acid chloride can be used, such as phenoxyacetyl chloride, although this is the subject of the copending application entitled "Phenoxyacetate Peracid Precursors and Perhydrolysis System Therewith, " inventors Alfred G. Zielske et al, filed concurrently herewith, and commonly assigned to The Clorox Company, said application being incorporated herein in its entirety by reference.

Also, in the above generic structures for the precursors of the invention, when n is 1, X is at the alpha-position to the terminal carbonyl group. In the present invention, under certain circumstances, such as when the nitrogen of the oxynitrogen bond is itself double bonded to a carbon atom (structure (II)), forming an oxime, X is O, oxygen. X, however, could also be another electronegative atom, such as —S—(sulfide, —N—(amine) or even $-NH_4{}^+-$ (quaternary ammonium). In the invention, however, it is most preferable that X is O (oxygen), or methylene.

As mentioned, n=1 to 6 carbylene substituents, but n=1 to 3 is more preferred, and most preferably n does not exceed about 2.

When n=1 or 2, the base carbonyl is a acetic acid or propionic acid derivative. The acetic acid derivatives have been found surprisingly effective and are discussed in two concurrently filed applications commonly assigned to The Clorox Company, namely, "Glycolate Ester Peracid Precursors, " inventors Ronald A. Fong et al, Ser. No. 928,070, filed Nov. 28, 1986, now U.S. Pat. No. 4,778,618, and "Phenoxyacetate Peracid Precursors and Perhydrolysis System Therewith, " inventors Alfred G. Zielske et al, Ser. No. 927,856, filed Nov. 6, 1986, now U.S. Pat. No. 4,859,500, both of which are incorporated herein by reference.

When the heteroatom, X is O (oxygen), and n is 1, the effect of an electronegative substituent alpha to the terminal carbonyl enhances the reactivity of the inventive precursors.

The electronic effect of this modification at the proximal methylene group (when n=1) appears to make the carbonyl group more susceptible to nucleophilic attack by a perhydroxide anion. The resulting enhanced reactivity results in higher peracid yields at low temperatures (e.g., 70° F.), across a broader pH range, and makes the perhydrolysis reaction to generate peracids less susceptible to critical activator to $H_2O_2$ ratios.

However, in another embodiment, when the leaving group of the precursor is structure (I), —ONR$^1$, it is preferred that X is methylene. As a representative example, the octanoyl group,

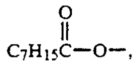

does not contain any heteroatoms within the alkyl chain.

In the following discussion, certain definitions are utilized:

Peracid precursor is equivalent to bleach activator. Both terms generally relate herein to reactive esters which have a leaving group substituent, which during perhydrolysis, actually cleaves off the acyl portion of the ester.

Perhydrolysis is the reaction which occurs when a peracid precursor or activator is combined in a reaction medium (aqueous medium) with an effective amount of a source of hydrogen peroxide.

The leaving group is basically a substituent which is attached via an oxygen bond to the acyl portion of the ester and which can be replaced by a perhydroxide anion ($OOH^{31}$) during perhydrolysis.

The basic reaction is

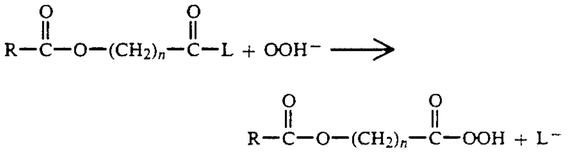

The present invention provides, in particular, novel oxynitrogen leaving groups having the general structures

—ONR$^1$ (I)

and

—ON=R$^2$ (II)

are attached to an acyl,

group to form the peracid precursors of this invention. These leaving groups have an oxygen atom attached to nitrogen which in turn can be attached to carbon atoms in a variety of structural configurations. The oxygen of the leaving group is attached directly to the carbonyl carbon to form the intact precursor.

When considering the activator structures below

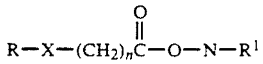 and (I)

-continued

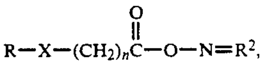
(II)

there are at least two different types of structure for the $R_1$ group and there is at least one type of structure for the $R^2$ group.

The first preferred structure for $R^1$ is where the nitrogen atom is attached to two carbonyl carbon groups. The leaving group then would be an oxyimide group:

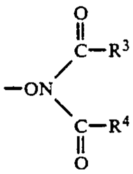
or
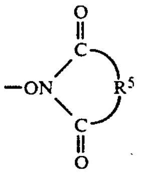

wherein $R^3$ and $R^4$ can be the same or different, and are preferably straight chain or branched $C_{1-20}$ alkyl, aryl, alkylaryl or mixtures thereof. If alkyl, $R^3$ and $R^4$ can be partially unsaturated. It is especially preferred that $R^3$ and $R^4$ are straight or branched chain $C_{1-6}$ alkyls, which can be the same or different. $R^5$ is preferably $C_{1-20}$ alkyl, aryl or alkylaryl, and completes a heterocycle. $R^5$ includes the preferred structure

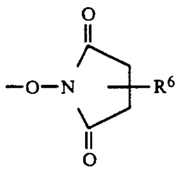

wherein $R^6$ can be an aromatic ring fused to the heterocycle, or $C_{1-6}$ alkyl.

Thus, these leaving group structures could contain an acyclic or cyclic oxyimide moiety. The above precursor can be seen as a combination of a carboxylic acid and a hydroxyimide compound:

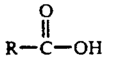
Carboxylic acid

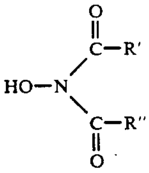
Hydroxyimide

These esters of imides can be prepared as described in Greene, *Protective Groups in Organic Synthesis,* p. 183, (incorporated by reference) and are generally the reaction products of acid chlorides and hydroxyimides.

Non-limiting examples of N-hydroxyimide which will provide the oxyimide leaving groups of the invention include: N-hydroxysuccinimide, N-hydroxyphthalimide, N-hydroxyglutarimide, N-hydroxynaphthalimide, N-hydroxymaleimide, N-hydroxydiacetylimide and N-hydroxydipropionylimide.

Especially preferred examples of oxyimide leaving groups are:

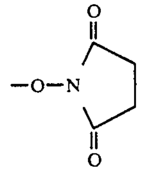
Oxysuccinimide

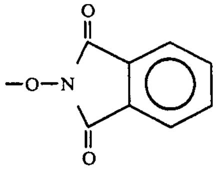
Oxyphthalimide

When treated with peroxide anion, a peracid is formed and the leaving group departs with oxygen attached to nitrogen and a negative charge on the oxygen atoms. The pKa (about 6) of the resulting hydroxyimides is quite low, making them excellent leaving groups.

The second preferred structure for $R^1$ is where the nitrogen atom is attached to at least two carbons. These are amine oxide leaving groups, comprising:

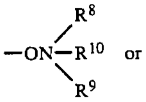
or
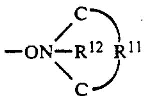

In the first preferred structure for amine oxides, $R^8$ and $R^9$ can be the same or different, and are preferably $C_{1-20}$ straight or branched chain alkyl, aryl, alkylaryl or mixtures thereof. If alkyl, the substituent could be partially unsaturated. Preferably, $R^8$ and $R^9$ are $C_{1-4}$ alkyls and can be the same or different. $R^{10}$ is preferably $C_{1-30}$ alkyl, aryl, alkylaryl and mixtures thereof. This $R^{10}$ substituent could also be partially unsaturated. It is most preferred that $R^8$ and $R^9$ are relatively short chain alkyl groups ($CH_3$ or $CH_2CH_3$) and $R^{10}$ is preferably $C_{1-20}$ alkyl, forming together a tertiary amine oxide.

Further, in the second preferred amine oxide structure, $R^{11}$ can be $C_{1-20}$ alkyl, aryl or alkylaryl, and completes a heterocycle. $R^{11}$ preferably completes an aromatic heterocycle of 5 carbon atoms and can be $C_{1-6}$ alkyl or aryl substituted. $R^{12}$ is preferably nothing, $C_{1-30}$ alkyl, aryl, alkylaryl or mixtures thereof. $R^{12}$ is more preferably $C_{1-20}$ alkyl if $R^{11}$ completes an aliphatic heterocycle. If $R^{11}$ completes an aromatic heterocycle, $R^{12}$ is nothing.

This type of structure is really a combination of a carboxylic acid and an amine oxide:

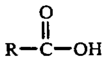
Carboxylic acid

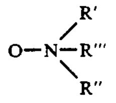
Amine oxide

Amine oxides can be prepared as described in March, Advanced Organic Chemistry, 2d Ed., 1977, p.1,111, which is incorporated herein by reference.

Non-limiting examples of amine oxides suitable for use as leaving groups herein can be derived from: pyridine N-oxide, trimethylamine N-oxide, 4-phenyl pyridine N-oxide, decyldimethylamine N-oxide, dodecyldimethylamine N-oxide, tetradecyldimethylamine N-oxide, hexadecyldimethylamine N-oxide, octyldimethylamine N-oxide, di(decyl)methylamine N-oxide, di(-docecyl)methylamine N-oxide, di(tetradecyl)methylamine N-oxide, 4-picoline N-oxide, 3-picoline N-oxide and 2-picoline N-oxide.

Especially preferred amine oxide leaving groups include:

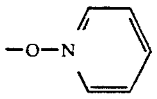

Pyridinium N-oxide

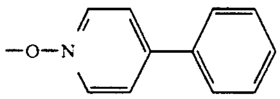

Phenylpyridinium N-oxide

When the precursor is attacked by peroxide anion, a peracid is formed and the leaving group leaves as an amine oxide, again with oxygen attached to nitrogen and the negative charge on the oxygen.

When the oxynitrogen leaving group is structure (II) $-ON=R^2$, preferred examples thereof are oximes.

In these oxime leaving groups, the nitrogen atom is combined to a carbon atom via a double bond. The leaving groups $-ON=R^2$ is represented by:

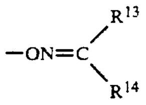

wherein $R^{13}$ and $R^{14}$ are individually H, $C_{1-20}$ alkyl, (which can be cycloalkyl, straight or branched chain), aryl, or alkylaryl. Preferably $R^{13}$ and $R^{14}$ are the same or different and range from $C_{1-6}$; and at least one of $R^{13}$ and $R^{14}$ is not H.

The structure of an oxime ester of a carboxylic acid and can be broken down into two parts:

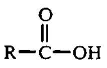

Carboxylic acid $HO-N=C(R')_2$

Oxime of a Carbonyl Compound

When R is $C_4$ to $C_{17}$ alkyl, or preferably $C_{6-12}$ alkyl, and where X, the heteroatom, is nothing, then a compound such as example (a) will occur. When X, the heteroatom, is oxygen, and the carbylene number n is 1, then a compound such as example (b) will occur.

An example of (a) is octanoyloxy dimethyl oxime ester,

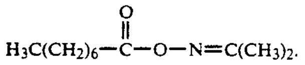

An example of (b) is hexanoxy acetyl dimethyl oxime ester,

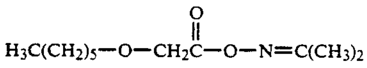

Oximes are generally derived from the reaction of hydroxylamines with either aldehydes or ketones (Allinger et al, *Organic Chemistry,* 2d Ed., p.562 (1976) (incorporated hereby by reference)), both of which are within the scope of this invention.

Non-limiting examples of an oxime leaving group are: (a) oximes of aldehydes (aldoximes), e.g., acetaldoxime, benzaldoxime, propionaldoxime, butylaldoxime, heptaldoxime, hexaldoxime, phenylacetaldoxime, p-tolualdoxime, anisaldoxime, caproaldoxime, valeraldoxime and p-nitrobenzaldoxime; and (b) oximes of ketones (ketoximes), e.g., acetone oxime (2-propanone oxime), methyl ethyl ketoxime (2-butanone oxime), 2-pentanone oxime, 2-hexanone oxime, 3-hexanone oxime, cyclohexanone oxime, acetophenone oxime, benzophenone oxime, and cyclopentanone oxime.

Particularly preferred oxime leaving groups are:

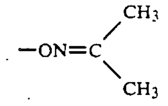

Acetone Oxime

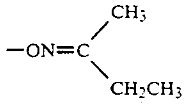

Methylethyl Ketoxime

When attacked by peroxide anion, the oxime ester forms a peracid and the oxime becomes the leaving group. It is rather surprising that the oximes are such good leaving groups since their pKa values (about 12) are rather high for a good leaving group. Previous experience teaches that leaving groups with pKa values for their conjugate acids in the 8–10 range make the best leaving groups.

The precursors of the invention can be incorporated into a liquid or solid matrix for use in liquid or solid detergent bleaches by dissolving into an appropriate solvent or surfactant or by dispersing liquid or liquefied precursors onto a substrate material, such as an inert salt (e.g. NaCl, $Na_2SO_4$) or other solid substrate, such as zeolites, sodium borate, or molecular sieves. Examples of appropriate solvents include acetone, non-nucleophilic alcohols, ethers or hydrocarbons. Other more water-dispersible or -miscible solvents may be considered. As an example of afffixation to a substrate material, the precursors of the present invention could be incorporated onto a non-particulate substrate such as disclosed in published European Patent Application EP 98 129, whose disclosure is incorporated herein by reference.

The inventive precursors with oxynitrogen leaving groups are apparently not as soluble in aqueous media as compared to phenyl sulfonates. Thus, a preferred embodiment of the invention is to combine the precursors with a surfactant. It is particularly preferred to coat these precursors with a nonionic or anionic surfactant that is solid at room temperature and melts at above about 40° C. A melt of surfactant may be simply admixed with peracid precursor, cooled and chopped into granules. Exemplary surfactants for such use are illustrated in Table I below:

TABLE I

| Commercial Name | m.p. | Type | Supplier |
|---|---|---|---|
| Pluronic F-98 | 55° C. | Nonionic | BASF Wyandotte |
| Neodol 25-30 | 47° C. | Nonionic | Shell Chemical |
| Neodol 25-60 | 53° C. | Nonionic | Shell Chemical |
| Tergitol-S-30 | 41° C. | Nonionic | Union Carbide |
| Tergitol-S-40 | 45° C. | Nonionic | Union Carbide |
| Pluronic 10R8 | 46° C. | Nonionic | BASF Wyandotte |
| Pluronic 17R8 | 53° C. | Nonionic | BASF Wyandotte |
| Tetronic 90R8 | 47° C. | Nonionic | BASF Wyandotte |
| Amidox C5 | 55° C. | Nonionic | Stepan |

The precursors, whether coated with the surfactants with melting completion temperatures above about 40° C. or not so coated, could also be admixed with other surfactants to provide, depending on formulation, either bleach additive or detergent compositions.

Particularly effective surfactants appear to be nonionic surfactants. Preferred surfactants of use include linear ethoxylated alcohols, such as those sold by Shell Chemical Company under the brand name Neodol. Other suitable nonionic surfactants can include other linear ethyxylated alcohols with an average length of 6 to 16 carbon atoms and averaging about 2 to 20 moles of ethylene oxide per mole of alcohol; linear and branched, primary and secondary ethyoxylated, propoxylated alcohols with an average length of about 6 to 16 carbon atoms and averaging 0-10 moles of ethylene oxide and about 1 to 10 moles of propylene oxide per mole of alcohol; linear and branched alkylphenoxy (polyethoxy) alcohols, otherwise known as ethyoxylated alkylphenols, with an average chain length of 8 to 16 carbon atoms and averaging 1.5 to 30 moles of ethylene oxide per mole of alcohol; and mixtures thereof.

Further suitable nonionic surfactants may include polyoxyethylene carboxylic acid esters, fatty acid glycerol esters, fatty acid and ethoxylated fatty acid alkanolamides, certain block copolymers of propylene oxide and ethylene oxide, and block polymers of propylene oxide and ethylene oxide with propoxylated ethylene diamine. Also included are such semi-polar nonionic surfactants like amine oxides, phosphine oxides, sulfoxides, and their ethoxylated derivatives.

Anionic surfactants may also be suitable. Examples of such anionic surfactants may include the ammonium, substituted ammonium (e.g., mono-, di-, and triethanolammonium), alkali metal and alkaline earth metal salts of $C_6$–$C_{20}$ fatty acids and rosin acids, linear and branched alkyl benzene sulfonates, alkyl sulfates, alkyl ether sulfates, alkane sulfonates, olefin sulfonates, hydroxylakane sulfonates, fatty acid monoglyceride sulfates, alkyl glyceryl ether sulfates, acyl sarcosinates and acyl N-methyltaurides.

Suitable cationic surfactants may include the quaternary ammonium compounds in which typically one of the groups linked to the nitrogen atoms is a $C_{12}$–$C_{18}$ alkyl group and the other three groups are short chained alkyl groups which may bear inert substituents such as phenyl groups.

Further, suitable amphoteric and zwitterionic surfactants which contains an anionic water-solubilizing group, a cationic group and a hydrophobic organic group may include amino carboxylic acids and their salts, amino dicarboxylic acids and their salts, alkylbetaines, alkyl aminopropylbetaines, sulfobetaines, alkyl imidazolinium derivatives, certain quaternary ammonium compounds, certain quaternary phosphonium compounds and certain tertiary sulfonium compounds. Other examples of potentially suitable zwitterionic surfactants can be found described in Jones, U.S. Pat. No. 4,005,029, at columns 11-15, which are incorporated herein by reference.

Further examples of anionic, nonionic, cationic and amphoteric surfactants which may be suitable for sue in this invention are depicted in Kirk-Othmer, *Encyclopedia of Chemical Technology,* Third Edition, Volume 22, pages 347-387, and *McCutcheon's Detergents and Emulsifiers,* North American Edition, 1983, which are incorporated herein by reference.

As mentioned hereinabove, other common detergent adjuncts may be added if a bleach or detergent bleach product is desired. If, for example, a dry bleach composition is desired, the following ranges (weight %) appear practicable:

| | |
|---|---|
| 0.5-50.0% | Hydrogen Peroxide Source |
| 0.05-25.0% | Precursor |
| 1.0-50.0% | Surfactant |
| 1.0-50.0% | Buffer |
| 5.0-99.9% | Filler, stabilizers, dyes, Fragrances, brighteners, etc. |

The hydrogen peroxide source may be selected from the alkali metal salts of percarbonate, perborate, persilicate and hydrogen peroxide adducts and hydrogen peroxide. Most preferred are sodium percarbonate, sodium perborate mono- and tetrahydrate, and hydrogen peroxide. Other peroxygen sources may be possible, such as monopersulfates and monoperphosphates. In liquid applications, liquid hydrogen peroxide solutions are preferred, but the precursor may need to be kept separate therefrom prior to combination in aqueous solution to prevent premature decomposition.

The range of peroxide to peracid precursor is preferably determined as a molar ration of peroxide to ester groups contained in the precursor. Thus, the range of peroxide to each ester group is a molar ration of from about 0:5 to 10:1, more preferably about 1:1 to 5:1 and most preferably about 1:1 to 2:1. It is preferred that this peracid precursor/peroxide composition provide preferably about 0.5 to 100 ppm A.O., and most preferably about 1 to 50 ppm A.O., and most preferably about 1 to 200 ppm A.O., in aqueous media.

A description of, and explanation of, A.O. measurement is found in the article of Sheldon N. Lewis, "Peracid and Peroxide Oxidations," In: Oxidation, 1969, pp. 213-258 which are incorporated herein by reference. Determination of the peracid can be ascertained by the analytical techniques taught in *Organic Peracid,* (Ed. by D. Swern), Vol. 1, pp. 501 et seq. (Ch.7) (1970) incorporated herein by reference.

An example of a practical execution of a liquid delivery system is to dispense separately metered amounts of the precursor (in some non-reactive fluid medium) and liquid hydrogen peroxide in a container such as described in Beacham et al, U.S. Pat. No. 4,585,150, commonly assigned to The Clorox Company, and incorporated herein by reference.

The buffer may be selected from sodium carbonate, sodium bicarbonate, sodium borate, sodium silicate, phosphoric acid salts, and other alkali metal/alkaline earth metal salts known to those skilled in the art. Organic buffers, such as succinates, maleates and acetates may also be suitable for use. It appears preferable to have sufficient buffer to attain an alkaline pH, i.e., above at least about 7.0, more preferably above about pH 9.0, and most preferably above about pH 10.0.

The filler material, which, in a detergent bleach application, may actually constitute the major constituent, by weight, of the detergent bleach, is usually sodium sulfate. Sodium chloride is another potential filler. Dyes include anthraquinone and similar blue dyes. Pigments, such as ultramarine blue (UMB), may also be used, and can have a bluing effect by depositing on fabrics washed with a detergent bleach containing UMB. Monastral colorants are also possible for inclusion. Brighteners, such as stilbene, styrene and styrylnapthalene brighteners (fluorescent whitening agents), may be included. Fragrances used for esthetic purposes are commercially available from Norda, International Flavors and Fragrances and Givaudan. Stabilizers include hydrated salts, such as magnesium sulfate, and boric acid.

In one of the preferred embodiments in which a compound such as in (I) below is the precursor, a preferred bleach composition has the following ingredients;

| | |
|---|---|
| 12.8% | Sodium Perborate Tetrahydrate |
| 8.3% | Octanoyloxy dimethyl oxime ester |
| 7.0% | Nonionic Surfactant |
| 15.0% | Sodium Carbonate |
| 56.9% | Sodium Sulfate |
| 100.0% | |

In another one of the preferred embodiments, in which a compound as in (II) below is the precursor, a preferred bleach composition has the following ingredients;

| | |
|---|---|
| 12.8% | Sodium Perborate Tetrahydrate |
| 10.0% | Octanoyloxy succinimide |
| 7.0% | Nonionic Surfactant |
| 15.0% | Sodium Carbonate |
| 55.2 | Sodium Sulfate |
| 100.0% | |

Other peroxygen sources, such as sodium perborate monohydrate or sodium percarbonate are suitable. If a more detergent-type product is desired, the amount of filler can be increased and the precursor halved or further decreased.

EXPERIMENTAL

The oxime esters can be prepared by treatment of an oxime with the acid chloride of the corresponding carboxylic acid. In order to have a liquid reaction medium, a non-reactive solvent is added, and a base.

The oximes can be purchase or prepared by treatment of a carbonyl compound with hydroxylamine. Two oximes, acetone oxime and methyl ethyl ketone oxime are readily available from commercial sources and are inexpensive.

EXAMPLE I

Preparation of acetone Oxime Ester of Octanoic Acid

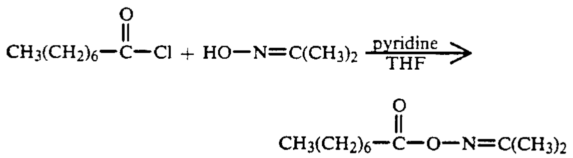

A 500 ml three-neck flask was fitted with a paddle stirrer, condenser and dry tube, and lowered into an oil bath. To the flask was added THF (100 ml), acetone oxime (15 g, 0.21 mole) pyridine (16.5 ml, 0.21 mole), and then octanoyl chloride (35 ml, 0.21 mole) in THF (50 ml), dropwise, with rapid stirring. A white solid (pyridine hydrochloride) precipitated from the solution. The reaction was allowed to stir in an oil both at a temperature of 50° C. for three hours. The reaction mixture was filtered and the solvent therein removed via roto-evaporator to give an orange oil (38.8 g).

Thin layer chromatography analysis (silica gel, HX-ETAC, 80-20) of the crude product showed one main spot ($I_2$ visualization) at $R_f$=0.47, a small spot at $R_f$=0.90 and a spot at the origin, probably pyridine hydrochloride. The crude product was placed on a column of silica gel (125 g, 230–400 mesh, 4 cm D X 25 cm H) and eluted with HX-ETAC (80–20). The fractions were monitored by GLC, the appropriate ones combined and solvent removed. In this way 37.8 g of a colorless oil was obtained.

The infrared spectrum of the oil gave a very strong carbonyl at 1768 $cm^{-1}$ and showed no sign of hydroxyl, acid chloride, or carboxylic acid. The $^{13}$C-NMR ($CDCl_3$, ppm downfield from TMS) showed only absorptions expected for the product. Using the numbering system shown, these assignments are made:

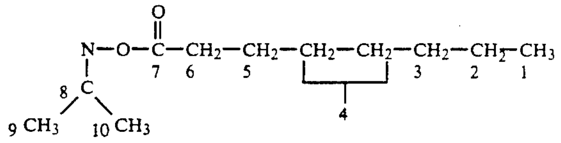

$C_7$(168.3), $C_8$(160.9), $C_3$(29.9), $C_6$(30.8), $C_4$(27.2), $C_5$(23.0), $C_2$(20.7), $C_9$(19.6), $C_{10}$(12.0), and $C_1$(14.5).

The acyloxyimides can be readily prepared by the treatment of a hydroxyimide with an acid chloride. While the acid chlorides are readily, commercially available, the hydroxyimides are not so commercially available.

EXAMPLE II

Preparation of Octanoyloxy Succinimide

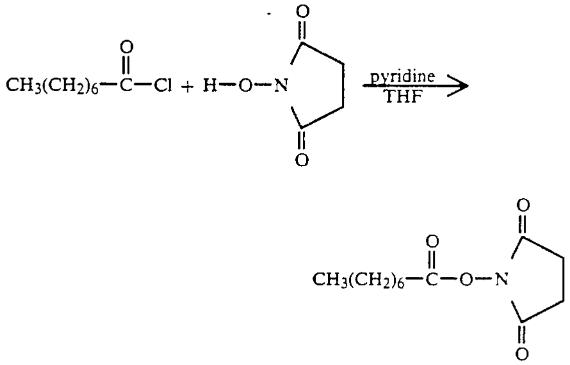

A 500 ml three-neck flask was fitted with paddle stirrer, condenser with drying tube, and lowered into an oil bath. To the flask was added THF (175 ml), the N-hydroxysuccinimide (9.5 g, 0.083 mole) and pyridine (6.7 ml, 0.83 mole). Octanoyl chloride (14.2 ml, 0.083 mole) was dissolved in THF (50 ml) and added to the reaction vessel over a period of 15 minutes. A white precipitate (pyridine hydrochloride) formed. The reaction mixture was heated at about 60° C. for 3 hours, filtered, the solvent removed via rota-evaporator to give a light yellow oil (18.9 g), which subsequently solidified.

Thin-layer chromotography analysis (silica gel, $CH_2Cl_2$) of the crude oil showed a main spot at $R_f$=0.60 (UV visulaization), a small spot at $R_f$=0.95 and a spot at the origin (pyridine hydrochloride). The crude product was placed on a column of silica gel (150 g, 230–400 mesh, 4 cm diameter×30 cm tall) and eluted with methylene chloride. The fractions were monitored by TLC, the appropriate ones combined, and the solvent removal. Thus a white solid (15.2 g, 76% yield) of m.p. 60.5°-61.0° C. was obtained.

The infrared spectrum of this solid gave a very strong broad carbonyl at 1735 $cm^{-1}$ and sharp ones at 1790 and 1822 cm $^{-1}$. The $^{13}$c-nmr ($CDCl_3$) was very clean, showing only those absorptions necessary for the product. Thus it showed ester carbonyl carbon at 169.5 (ppm downfield from TMS), imide carbonyl at 170.0 and the methylene and methyl carbons at 14.0–31.6 ppm. Analysis of the solid by saponification number gave a purity of 100%.

The acyl oxy ammonium chloride type compounds can be prepared by treatment of an amine oxide with an acid chloride. Both amine oxides and acid chlorides are readily available commercially so this should provide for a large variety of practical precursors. However, the product appears to be formed as a nice solid only when certain high molecular weight amine oxides are used. Unless care is taken in selecting the reaction conditions and the reagents, the reaction may at times form oils.

EXAMPLE III

Preparation of Octanoyloxy Ester of 4-Phenylpyridine Oxide

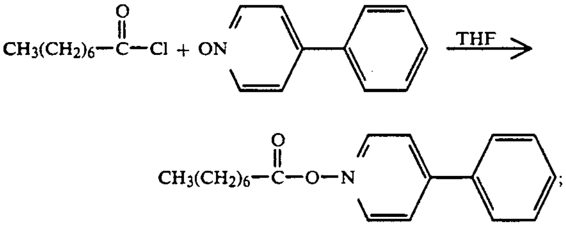

A 500 ml three-neck flask was fitted with a paddle stirrer, drying tube, and flushed with nitrogen.

To the flask was added THF (150 ml) and a 4-phenylpyridine N-oxide (5 g, 0.029 mole). A light yellow solution resulted. To this was added rapidly octanoyl chloride (5.0 ml, 0.029 mole) in THF (20 ml). The mixture was stirred very rapidly for 1½ minutes. A gelatinous precipitate formed almost immediately. When the viscous solution was diluted with ether (about 300 ml), a white solid layer separated. The mix was filtered to give a white solid which was washed with ether. The dried white solid (7.0 g, 72% yield) had a carbonyl absorption at 1822 cm$^{-1}$ in the infrared spectrum. The $^{13}$C-NMR was very clean and showed only those absorptions necessary for the product. A carbonyl at 174.5 (DMSO solvent, ppm downfield from TMS) was observed in addition to absorptions for the aromatic carbons and those for the alkyl chain.

When treated with alkaline, aqueous peroxide anion, the precursors described form peracids in solution. The table below summarizes the perhydrolysis yields of typical precursors.

TABLE I

| Item | Structure | % Peracid Yield* |
|---|---|---|
| 1 | 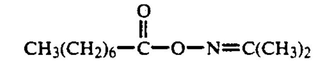 | 46% |
| 2 | 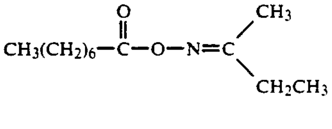 | 37% |

TABLE I-continued

| Item | Structure | % Peracid Yield* |
|---|---|---|
| 3 | 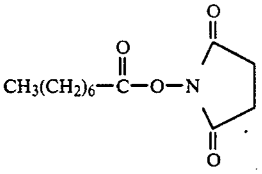 | 90% |
| 4 | 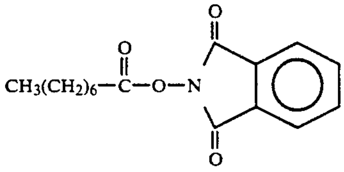 | 86% |
| 5 | 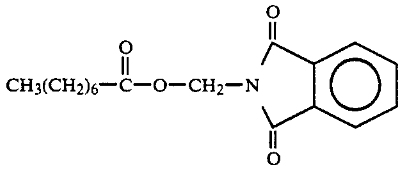 | none |
| 6 | 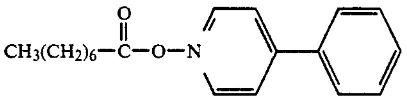 | 21% |

*pH 10.5, 5 min, 70° F. 2:1 peroxide: activator molar ratio, Pluronic L63 surfactant (.1 wt %)

A comparison of item 5 with all the others, shows the importance of having the oxygen atom attached directly to nitrogen atom of the leaving group, in accordance with the teachings of the invention.

While the foregoing examples and discussion of the invention depict detailed embodiments thereof, it is to be understood that applicants do not limit themselves to such detailed embodiments and this application includes such variations, modifications and equivalents which would be known to those skilled in the art and do not depart from the teachings of the invention. The claims, which are appended hereto, form a similarly non-limiting part of the invention herein.

What is claimed is:

1. A bleaching composition comprising oxyimide esters having the structures:

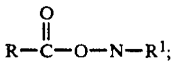; or

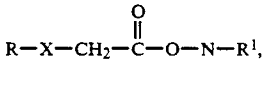, wherein R is $C_5$ to $C_9$ alkyl; $R^1$ has at least one carbon atom singly bonded directly to N; is —O—, —N—, —S— or quaternary ammonium; wherein the substituent —O—N—$R^1$ is either

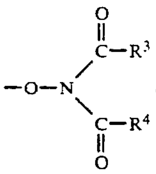 or 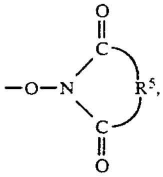, and wherein $R_3$ and $R_4$ are the same or different, and are separately straight or branched chain $C_{1-20}$ alkyl, aryl, alkylaryl or mixtures thereof; and $R_5$ is straight or branched chain $C_{1-20}$ alkyl, aryl, or alkylaryl and completes a heterocycle; and a bleach effective amount of a source of hydrogen peroxide.

2. The bleaching composition of claim 1 wherein the precursor has the leaving group

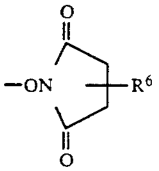

wherein $R^6$ is H, methylene, an aromatic ring fused to the heterocycle, or $C_{1-6}$ alkyl.

3. The bleaching composition of claim 2 wherein the precursor is

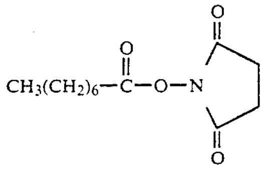

4. The bleaching composition of claim 2 wherein the precursor is

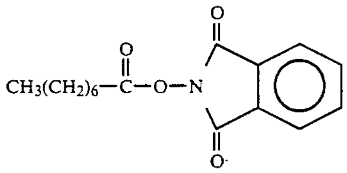

5. The bleaching composition of claim 1 wherein the heteroatom, X, is oxygen.

6. The bleaching composition of claim 1 wherein the source of hydrogen peroxide (b) is selected from the group consisting of hydrogen peroxide, hydrogen peroxide adducts, alkali metal and alkaline earth perborates.

7. The bleaching composition of claim 6 wherein said source of hydrogen peroxide is an alkali metal perborate selected from the mono- and tetrahydrate forms of sodium perborate.

8. The bleaching composition of claim 7 wherein the molar ratio of hydrogen peroxide source to precursor is 0.5:1 to 10:1, based on moles of $H_2O_2$ to moles of ester.

9. The bleaching composition of claim 1 further comprising (c) an adjunct selected from the group consisting of surfactants, builders, fillers, enzymes, fluorescent whitening agents, pigments, dyes, fragrances, stabilizers and buffers.

10. The bleaching composition of claim 1 in which the precursor of (a) is coated with a surfactant having a melting completion temperature above about 40° C.

* * * * *